(12) United States Patent
Amber et al.

(10) Patent No.: US 10,560,496 B2
(45) Date of Patent: *Feb. 11, 2020

(54) AUTOMATIC REGISTRATION OF DEVICES

(71) Applicant: INTERNATIONAL BUSINESS MACHINES CORPORATION, Armonk, NY (US)

(72) Inventors: Thomas J. Amber, Vail, AZ (US); Louie A. Dickens, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 451 days.

This patent is subject to a terminal disclaimer.

(21) Appl. No.: 14/923,804

(22) Filed: Oct. 27, 2015

(65) Prior Publication Data

US 2016/0050239 A1    Feb. 18, 2016

Related U.S. Application Data

(63) Continuation of application No. 13/049,796, filed on Mar. 16, 2011, now Pat. No. 9,203,876.

(51) Int. Cl.
*G06F 15/16*      (2006.01)
*H04L 29/06*      (2006.01)
*H04L 29/08*      (2006.01)

(52) U.S. Cl.
CPC ...... *H04L 65/1073* (2013.01); *H04L 67/1097* (2013.01); *H04L 69/08* (2013.01)

(58) Field of Classification Search
CPC .................................................. H04L 65/1073
See application file for complete search history.

(56) References Cited

U.S. PATENT DOCUMENTS

| | | | |
|---|---|---|---|
| 6,212,585 B1 | 4/2001 | Chrabaszcz | |
| 6,400,730 B1 | 6/2002 | Latif et al. | |
| 6,622,163 B1 | 9/2003 | Tawill et al. | |
| 6,968,434 B2 | 11/2005 | Kamano et al. | |
| 7,340,167 B2 * | 3/2008 | McGlaughlin | H04L 49/357 370/351 |
| 7,936,769 B2 | 5/2011 | Chung et al. | |
| 8,135,858 B2 | 3/2012 | Shanbhag et al. | |
| 8,195,904 B2 | 6/2012 | Kamano et al. | |
| 9,210,073 B2 * | 12/2015 | Wrenn | H04L 45/00 |
| 9,608,939 B2 * | 3/2017 | Shukla | H04L 49/357 |
| 9,838,297 B2 * | 12/2017 | Wrenn | H04L 45/121 |
| 2004/0028038 A1 | 2/2004 | Anderson et al. | |

(Continued)

*Primary Examiner* — Douglas B Blair
(74) *Attorney, Agent, or Firm* — Griffiths & Seaton PLLC

(57) ABSTRACT

Exemplary methods, computer systems, and computer program products for automatic registration of devices in a computer environment are provided. In one embodiment, the computer environment is configured for monitoring a fibre channel. In response to one of a fabric login (FLOGI) and a fixed disk (Fdisk) received from one of an initiator and a target disk, executing each of an automatic name server registration, a state change registration, and a management server registration to identify at least one of the plurality of devices, and signing up one of the initiator and the target disk for the automatic name server registration, the state change registration, and the management server registration, wherein port initialization is eliminated for the initiator.

15 Claims, 4 Drawing Sheets

(56) References Cited

U.S. PATENT DOCUMENTS

| | | |
|---|---|---|
| 2004/0081087 A1 | 4/2004 | Shea |
| 2005/0177641 A1* | 8/2005 | Yamagami ............ H04L 63/101 709/229 |
| 2006/0034284 A1 | 2/2006 | Saklecha et al. |
| 2006/0155831 A1 | 7/2006 | Chandrasekaran |
| 2008/0199012 A1 | 8/2008 | Niinomi |
| 2010/0220734 A1 | 9/2010 | Makishima et al. |
| 2010/0232793 A1 | 9/2010 | Atkinson |
| 2011/0022691 A1 | 1/2011 | Banerjee et al. |
| 2011/0299525 A1 | 12/2011 | Peterson |
| 2012/0177370 A1 | 7/2012 | Berman |

\* cited by examiner

AUTOMATIC REGISTRATION OF DEVICES

CROSS REFERENCE TO RELATED APPLICATIONS

This application is a Continuation of U.S. patent application Ser. No. 13/049,796 filed on Mar. 16, 2011.

BACKGROUND OF THE INVENTION

Field of the Invention

The present invention relates generally to computers, and more particularly, to automatic registration of devices in a computing storage environment.

Description of the Related Art

In today's society, computer systems are commonplace. Computer systems may be found in the workplace, at home, or at school. Computer systems may include data storage systems, or disk storage systems, to process and store data. A storage system may include various storage components, such as one or more disk drives configured in a storage environment. For example, the storage environment may include a number of disk drives implemented in an array, such as a Redundant Array of Independent Disks (RAID) topology, to provide data security in the event of a hardware or software failure. The storage environment may also include other storage components, such as controllers and interfaces to mange the flow of data.

Computer system of today offers the ability to virtualize storage devices, separating the virtual or logical view of storage from the physical view. Storage virtualization allows administrators to deal and manage the simpler virtual view, while the storage management system handles the complexities of how that view is implemented on top of physical resources. Therefore, a high-performance and secure storage virtualization solution is crucial for such storage networks.

SUMMARY OF THE DESCRIBED EMBODIMENTS

Storage area networks, also referred to as SANs, are dedicated networks that connect one or more systems to storage devices and subsystems. Today, fiber channel is one of the leading technologies for SANs. In a fiber channel fabric topology, the storage networks are constructed with network switches. A fabric may be composed of a single switch or multiple switches. Ports on fabric networks connect nodes to switches on low-latency, point-to-point connections. Virtualization in computer systems is creating more demands of switches and switch resources. Therefore, a need exists for a mechanism to improve consistency and reduce switch overhead, during, for example, the initialization and registration process.

Accordingly, and in view of the foregoing, various exemplary methods, computer systems, and computer program products for automatic registration of devices in a computer environment are provided. In one embodiment, by way of example only, the computer environment is configured for, in response to a fabric login (FLOGI) and/or a fixed disk (Fdisk) received from an initiator and/or a target disk, executing an automatic name server registration, state change registration, and management server registration to identify at least one of the devices.

In an additional aspect, various exemplary methods, computer systems, and computer program products for automatic registration of devices in a computer environment are provided. In one embodiment, the computer environment is configured for monitoring a fibre channel. In response to one of a fabric login (FLOGI) and a fixed disk (Fdisk) received from one of an initiator and a target disk, executing each of an automatic name server registration, a state change registration, and a management server registration to identify at least one of the plurality of devices, and signing up one of the initiator and the target disk for the automatic name server registration, the state change registration, and the management server registration, wherein port initialization is eliminated for the initiator In addition to the foregoing exemplary embodiment, various other system and computer program product embodiments are provided and supply related advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF CERTAIN EMBODIMENTS

Figure 1:
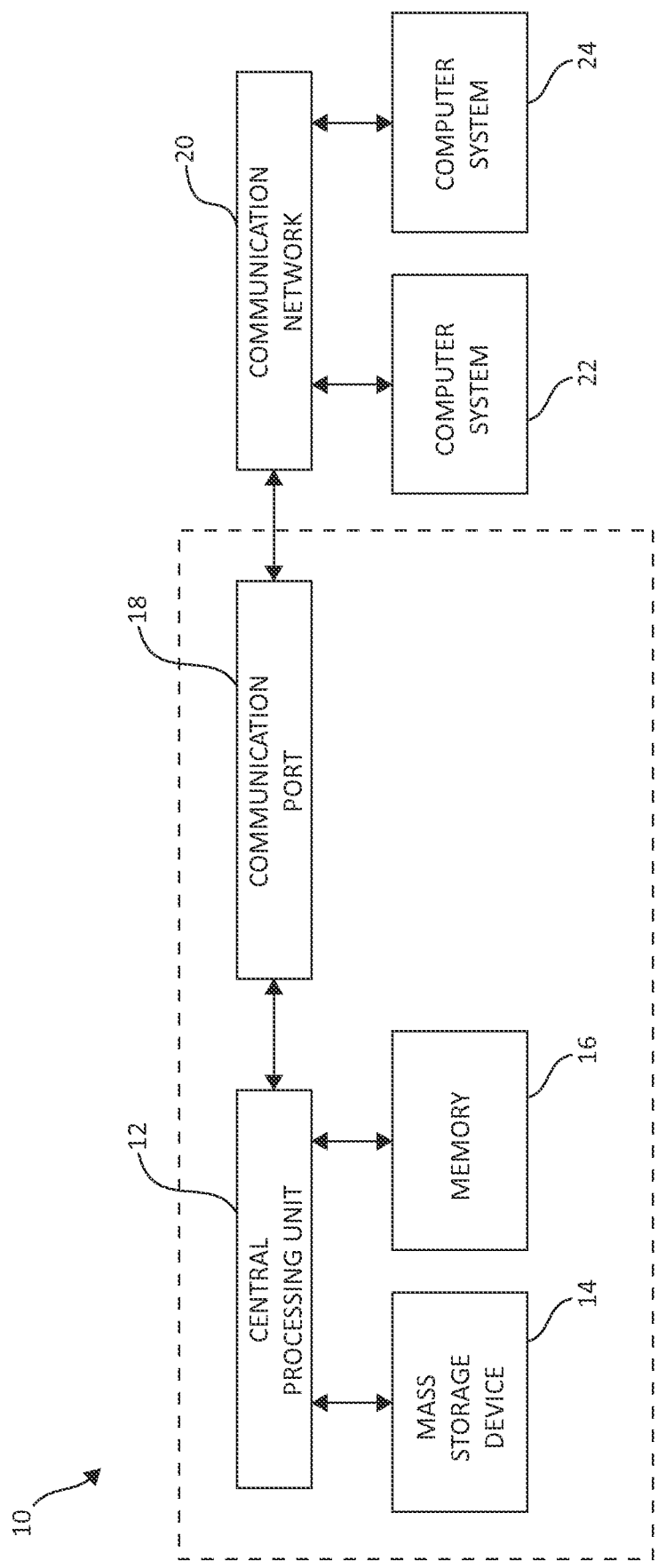
FIG. 1 illustrates a computer system environment having an example storage device in which aspects of the present invention may be realized.

Fibre Channel (FC) is the general name of an integrated set of standards being developed by the American National Standards Institute (ANSI). In Fibre Channel terms the switch connecting the devices is called Fabric. The link may be two unidirectional fibres transmitting to opposite directions with their associated transmitter and receiver. Each fibre may be attached to a transmitter of a port at one end and a receiver of another port at the other end. When a Fabric is present in the configuration, the fibre may attach to a node port (N_Port) and to a port of the Fabric (F_Port). The topology may be selected depending on system performance requirements or packaging options. Possible FC topologies include point-to-point, crosspoint switched or arbitrated loop. Fibre Channel may be split into layers, namely: FC4, FC-3, FC2, FC1, and FC0. Each of these fibre channel levels may be in communication and interface with the channel above and/or below.

At the heart of any Fibre Channel storage-area network (FC SAN) is the switching equipment that connects the host servers with the storage systems. The switching equipment performs basic connectivity between FC devices and can also determine the type of FC devices that are connected, handle FC zoning function, and typically allow connections to other Fibre Channel switches to extend the storage network. There are two basic classes of FC switching equipment: directors and switches. While both directors and switches perform the same fundamental functions, there are significant differences between the two switch classes. Basic FC switches generally have a fixed number of ports and provide basic switching functions with limited scalability and redundancy within the switch. Currently the larger director class switches have anywhere from 384 ports and with the advent of virtualization a single device can become many virtual devices, (up to 254) 384×254=97 k+.

Each one of the virtual devices may be required to behave identical to a physical device. In the case of Fibre channel, the physical device completes the first step of the process commonly known in the art of fibre channel as fabric login. Each physical and virtual address is required to complete many different initialization steps. The initialization and registration process is a switch resource consumer resulting in slower overall performance such as when registering with the name server or registering for state change notification. The initialization process creates demands on the switches that are already busy sending and receiving traffic. In addition, consistency issues will surface because not all devices register the same information in the name server.

The illustrated embodiments described, following, serve to address the issues described previously by effecting automatic registration of both physical and/or virtual devices. In one embodiment, in response to a fabric login (FLOGI) and/or a fixed disk (Fdisk) received from an initiator and/or a target disk, the mechanisms of the illustrated embodiments may perform an automatic name server registration, state change registration, and management server registration to identify one of the physical and/or virtual devices. In one embodiment, the execution of the automatic name server registration, state change registration, and management server registration may be performed, for example, by a switch controller on a fabric channel at a fibre channel 3 (FC-3) link service level. Polling is eliminated for each of the physical and/or virtual devices. The need for additional registration of the physical and virtual devices is eliminated.

In one embodiment, any registration requirements for the automatic name server registration, automatic state change registration, and automatic management server registration may be performed for devices that ether choose not to or have a desire to have the entire registration process automated. A device either physical or virtual may be new or existing, thus the mechanisms of the illustrated embodiments are backwards compatible with any existing device. The automatic registration for an identified physical and virtual device may be provided to a server, for example.

Turning to FIG. 1, an example computer system 10 is depicted in which aspects of the present invention may be realized. Computer system 10 includes central processing unit (CPU) 12, which is connected to mass storage device(s) 14 and memory device 16. Mass storage devices can include hard disk drive (HDD) devices, which can be configured in a redundant array of independent disks (RAID). The backup operations further described can be executed on device(s) 14, located in system 10 or elsewhere. Memory device 16 can include such memory as electrically erasable programmable read only memory (EEPROM) or a host of related devices. Memory device 16 and mass storage device 14 are connected to CPU 12 via a signal-bearing medium. In addition, CPU 12 is connected through communication port 18 to a communication network 20, having an attached plurality of additional computer systems 22 and 24.

Figure 2:
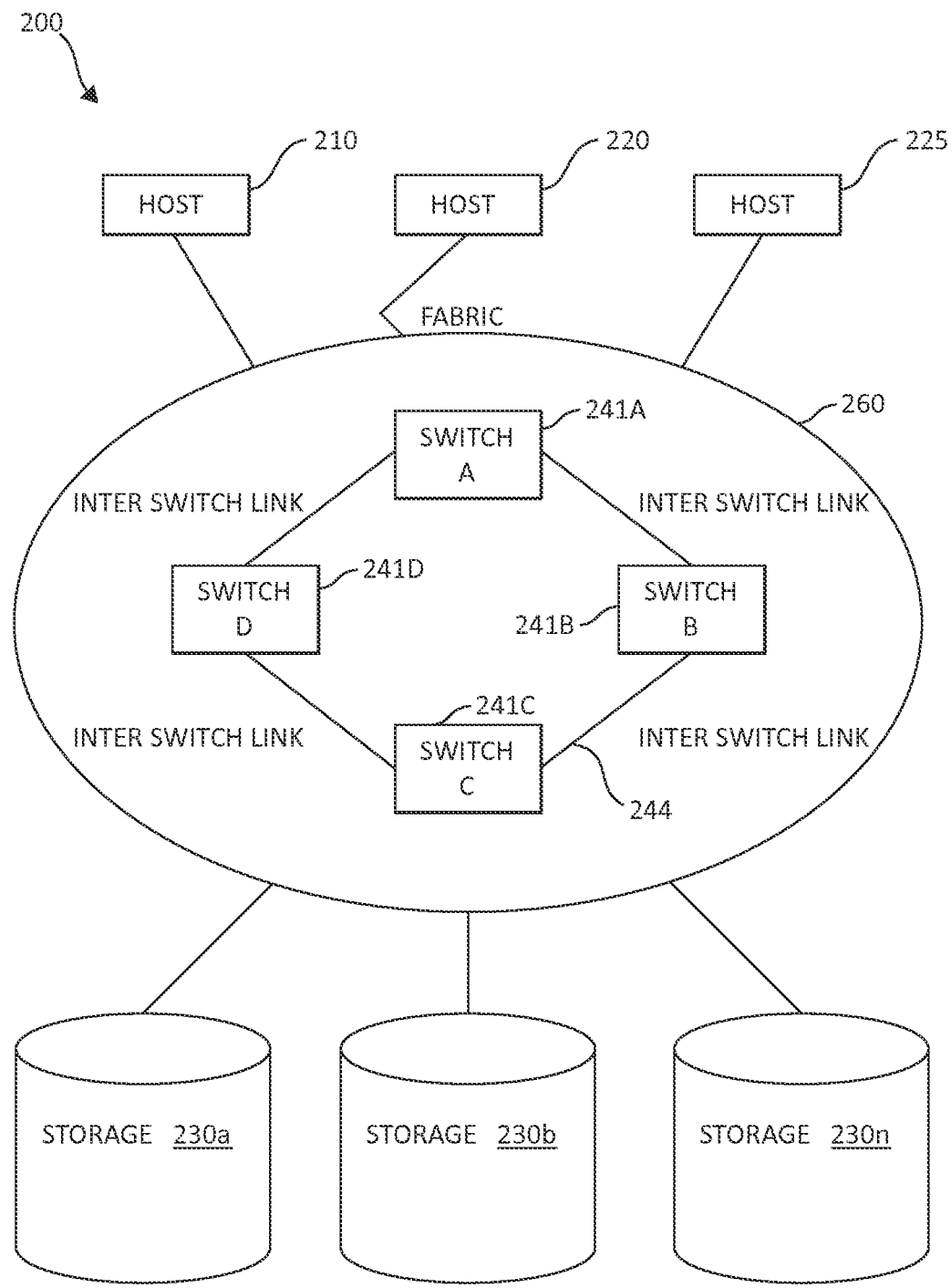
FIG. 2 illustrates an exemplary block diagram showing a hardware structure of a data storage system in a computer system in which aspects of the present invention may be realized.

FIG. 2 is an exemplary block diagram showing a hardware structure of a data storage system in a computer system in which aspects of the present invention may be realized. There are a variety of topologies that may be constructed using storage, servers, hosts, switch components in a Fibre channel network. In one embodiment, by way of example only, host computers 210, 220, 225, are illustrated with each acting as a central processing unit for performing data processing in part of a data storage system 200. In one embodiment, the hosts, 210, 220, and 225 may be one or more new physical devices or logical devices in the data storage system 200 in which aspects of the present invention may be realized. In one embodiment, a data storage system 200 may be implemented as IBM® System Storage™ DS8000™. A network connection may be a fibre channel fabric. The hosts, 210, 220, and 225 may be local or distributed among one or more locations and may be equipped with any type of fabric (or fabric channel) 260 or network adapter (not shown in FIG. 1). Data storage system 200 may be equipped with a suitable fabric 260 to communicate.

To facilitate a clearer understanding of the methods described herein, the fabric channel 260 is shown in FIG. 2 with several switches 241 (shown in FIG. 2 as 241A-D) connected and in operation within the fabric 260. The fabric 260 may be in communication directly or indirectly with each of the hosts 210, 220, 225 and also the storage devices 230 (shown in FIG. 2 as 230A-C). Storage 230 may be physically comprised of one or more storage devices. In certain embodiments, by way of example only, storage 230 may be comprised of a JBOD (Just a Bunch of Disks) array or a RAID (Redundant Array of Independent Disks) array.

Each of the switches 241 within the fabric 260 are linked together by a inter link switch 244 to communicate and interface with the other switches 241. In one embodiment, for example, switch 241A is linked to switch 241D and 241B, switch 241B is linked to 241A and 241C, switch 241C is linked to switch 241B and 241D, and switch 241D is linked to switch 241A and switch 241C. Such topology, illustrates one embodiment, with each of the switches 241A-D connected and interfacing with each other within the fabric 260 for executing the steps and mechanisms for automatic registration of physical and/or virtual devices by a switch controller executing at a FC-3 link service level in which aspects of the present invention may be realized. The mechanisms of the illustrated embodiment may be implemented at any of the fibre channel service levels according to the need of a user. Each of the components within the storage system 200 may be linked together, interface, and may be in association and/or communication with each other to realize various aspects of the mechanisms of the illustrated embodiments.

Figure 3:
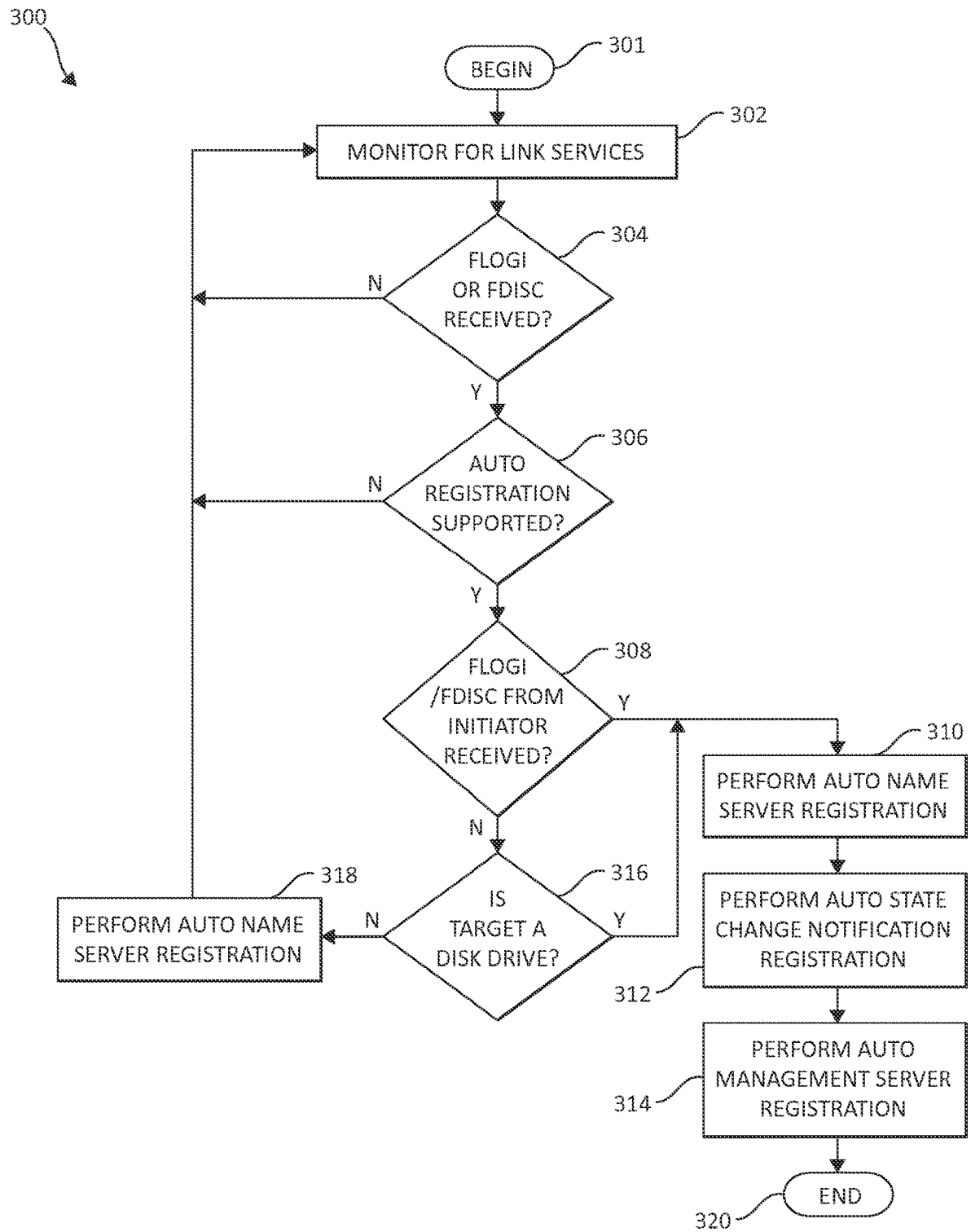
FIG. 3 is a flowchart illustrating an exemplary method of automatic registration of devices by a switch controller at a fibre channel 3 (FC-3) link service level.

FIG. 3 is a flowchart illustrating an exemplary method 300 of automatic registration of both physical and virtual devices. Currently when an initiator or target completes the initial fabric login (flogi) or optionally one or more Fabric Discovery (fdisc), there are a series of registrations that are required to be performed. If an initiator or target fails to complete any of these required registrations, these registrations may be performed for them. If an initiator and/or target chooses and supports the auto registration it may leave the entire registration process to the automation device.

The method 300 begins (step 301) with the hardware in the switches monitoring for the receipt of link services at the Fibre channel link services level (step 302). The link services link services are services that are defined in Fibre Channel to manage the communications between devices, error recovery and many other functions such as they are used to notify other devices of changes in the fabric as well as they provide a device look up service that is very similar to the phone book.

The method 300 will then determine whether a fabric login (FLOGI) or a fixed disk (Fdisk) has been received on the fabric (step 304), if not, then monitoring is continued (step 302). If the fabric login (FLOGI) and/or a fixed disk (Fdisk) has been received on the fabric, the method 300 will check to see if the automatic registration is supported on the new device(s) (logical or physical) (step 306). If not, then again, the method 300 will continue to monitor the link services at the FC 3 link services level (step 302). If the automatic registration is supported on the new device(s), the method 300 will determine, check, or identify if the FLOGI or Fdisk is received from an initiator (step 308).

If the automatic registration is not supported on the new device, the method 300 will continue to have the control switches monitoring the link services at the FC 3 link services level (step 302). If yes, the method will perform an automatic server registration (step 310), an automatic state change notification registration (step 312), and an automatic management server registration (step 314). For each of the automatic server registration (step 310), the automatic state change notification registration (step 312), and the automatic management server registration (step 314), the method will perform any and all of the registration requirements.

The initiator should be registered with the nameserver, signed up for auto state change registration, and also signed up with the auto management server registration. However, if not, the initiator may register with the switch nameserver, sign up for auto state change registration and sign up with the auto management server registration at any point in the operation of the method 300. The initiator is adapted and configured to assist or perform the steps for any existing device or new device unable or unwilling to perform the automatic server registration (step 310), the automatic state change notification registration (step 312), and/or the automatic management server registration (step 314). The method 300 then ends (step 320).

If the device is not received from an initiator, the method 300 will determine if the device is a target disk drive (storage device) (step 316). If the new device is a target disk drive, then the method will perform an automatic server registration (step 310), an automatic state change notification registration (step 312), and an automatic management server registration (step 314) for the target disk drive and the method 300 will end (step 320). Again, for each of the automatic server registration (step 310), the automatic state change notification registration (step 312), and the automatic management server registration (step 314), the method will perform any of the registration requirements. If the device is not a target disk drive (storage device), the method 300 will perform an automatic name server registration with the switch nameserver (step 318) and then return and continue to have the control switch monitor the link services at the FC-3 link service level (step 302) and will repeat the method 300 as previously described.

It should be noted that the method is fully backward compatible with any existing devices (logical or physical) and may include performing any of the operations of method 300 for existing devices. Thus, although the device described in the method 300 mentions a "new" device, the device may be an "existing" device. Furthermore, it should be noted that the term "device" in any part described or mentioned herein may include multiple devices.

Figure 4:
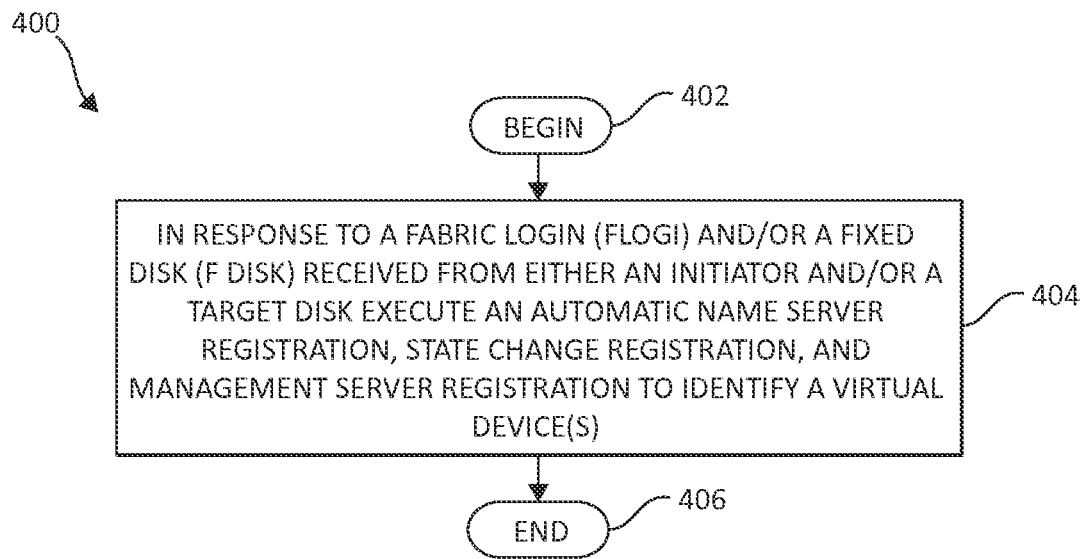
FIG. 4 is a flowchart illustrating an exemplary method for automatic registration.

FIG. 4 is a flowchart illustrating an exemplary method 400 for automatic registration. The method 400 begins (step 402) in response to a fabric login (FLOGI) and/or a fixed disk (Fdisk) received from either an initiator and/or a target disk executing an automatic name server registration, state change registration, and management server registration to identify a physical and/or virtual device(s) (step 404). The method then ends (step 406).

As previously mentioned, in one embodiment, execution of the automatic name server registration, state change registration, and management server registration may be performed by a switch controller on a fabric channel at a fibre channel 3 (FC-3) link service level. As a result of implementing the mechanisms of the illustrated embodiments, polling is eliminated for each of the physical and/or virtual devices. Any registration requirements for the automatic name server registration, automatic state change registration, and automatic management server registration may be performed. The physical and/or virtual device may be new or existing, thus the mechanisms of the illustrated embodiments are backwards compatible with any existing device. In one embodiment, the automatic registration for an identified physical and/or virtual device may be provided to a server.

It is appreciated that terminology such as "mandatory", "required", "need" and "must" refer to implementation choices made within the context of a particular implementation or application described here within for clarity and are not intended to be limiting since in an alternative implantation, operation, construction, or implementation, the same elements might be defined as not mandatory and not required or might even be eliminated altogether. In addition, a component or structure mentioned or described herein in the singular context may only be described in a particular implementation or application for clarity and by way of example and is not intended to be limiting because multiple components or structures may be utilized in an alternative implantation, operation, construction, and/or implementation of the methods and systems described herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagram in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

What is claimed is:

1. A method for automatic registration of a plurality of devices by a processor device in a computing storage environment, comprising:
   monitoring a fibre channel; and
   in response to one of a fabric login (FLOGI) and a fixed disk (Fdisk) received from an initiator,
      determining that automatic registration is supported for the initiator,
      determining that a switch controller is unable to complete each of an automatic name server registration, a state change registration, and a management server registration, and
      executing each of the automatic name server registration, the state change registration, and the management server registration by the initiator to identify the initiator thereby completing the automatic registration; wherein as part of the automatic registration, polling of the initiator is eliminated.

2. The method of claim 1, wherein the executing is performed on a fabric channel at a fibre channel 3 (FC-3) link service level.

3. The method of claim 1, further including performing at least one of:
   receiving on a fabric channel by the switch controller one of the FLOGI and the Fdisk at a fibre channel 3 (FC-3) link service level, and
   identifying that the FLOGI and the Fdisk at the FC-3 link service level is received from the initiator.

4. The method of claim 1, further including registering the initiator with a switch nameserver.

5. The method of claim 1, further including performing the automatic name server registration with a switch nameserver at a fibre channel 3 (FC-3) link service level for a device not identified as the initiator.

6. A system for automatic registration of a plurality of devices in a computing storage environment, comprising:
   a processor device executing instructions stored in a memory device, wherein the processor device, when executing the instructions:
   monitors a fibre channel, and
   in response to one of a fabric login (FLOGI) and a fixed disk (Fdisk) received from an initiator,
      determines that automatic registration is supported for the initiator,
      determines that a switch controller is unable to complete each of an automatic name server registration, a state change registration, and a management server registration, and
      executes each of the automatic name server registration, the state change registration, and the management server registration by the initiator to identify the initiator thereby completing the automatic registration; wherein as part of the automatic registration, polling of the initiator is eliminated.

7. The system of claim 6, wherein the processor device performs the execution of the at least one of the automatic name server registration, the state change registration, and the management server registration on a fabric channel at a fibre channel 3 (FC-3) link service level.

8. The system of claim 6, wherein the processor device performs at least one of:
   receiving on a fabric channel by the switch controller one of the FLOGI and the Fdisk at a fibre channel 3 (FC-3) link service level, and
   identifying that the FLOGI and the Fdisk at the FC-3 link service level is received from the initiator.

9. The system of claim 6, wherein the processor device registers the initiator with a switch nameserver.

10. The system of claim 6, wherein the processor device performs the automatic name server registration with a switch nameserver at a fibre channel 3 (FC-3) link service level for a device not identified as the initiator.

11. A computer program product for automatic registration of a plurality of devices by a processor device in a computing storage environment, the computer program product comprising a non-transitory computer-readable storage medium having computer-readable program code portions stored therein, the computer-readable program code portions comprising:
   a first executable portion that monitors a fibre channel, and
   a second executable portion that, in response to one of a fabric login (FLOGI) and a fixed disk (Fdisk) received from an initiator,
   determines that automatic registration is supported for the initiator,
   determines that a switch controller is unable to complete each of an automatic name server registration, a state change registration, and a management server registration, and
   executes each of the automatic name server registration, the state change registration, and the management server registration by the initiator to identify the initiator thereby completing the automatic registration; wherein as part of the automatic registration, polling of the initiator is eliminated.

12. The computer program product of claim 11, further including a third executable portion that performs the execution of the at least one of the automatic name server registration, the state change registration, and the management server registration on a fabric channel at a fibre channel 3 (FC-3) link service level.

13. The computer program product of claim 11, further including a third executable portion that performs at least one of:
   receiving on a fabric channel by the switch controller one of the FLOGI and the Fdisk at a fibre channel 3 (FC-3) link service level, and
   identifying that the FLOGI and the Fdisk at the FC-3 link service level is received from the initiator.

14. The computer program product of claim 11, further including a third executable portion that registers the initiator with a switch nameserver.

15. The computer program product of claim 11, further including a third executable portion that performs the automatic name server registration with a switch nameserver at a fibre channel 3 (FC-3) link service level for a device not identified as the initiator.

* * * * *